Oct. 23, 1945.  C. R. PATON  2,387,344
INTERNAL-COMBUSTION ENGINE
Original Filed Sept. 13, 1941
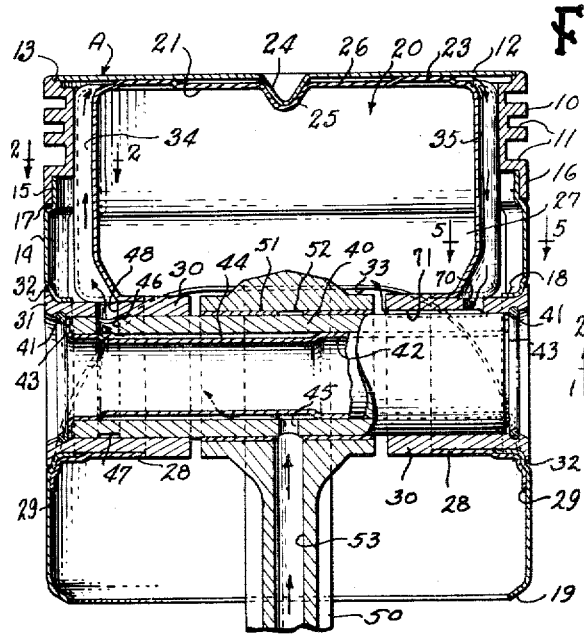
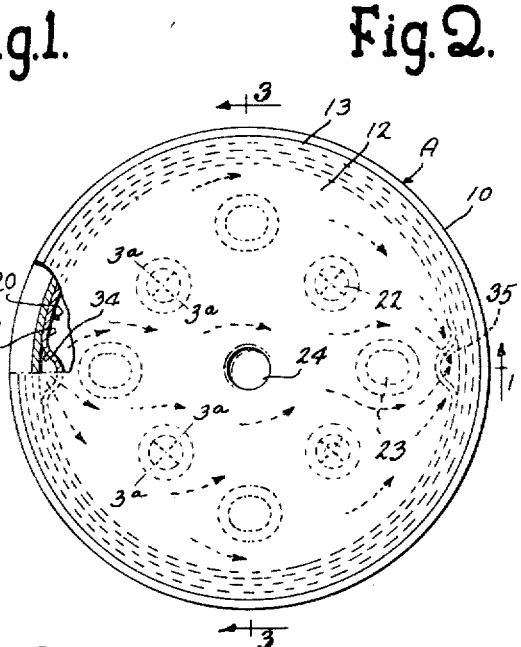
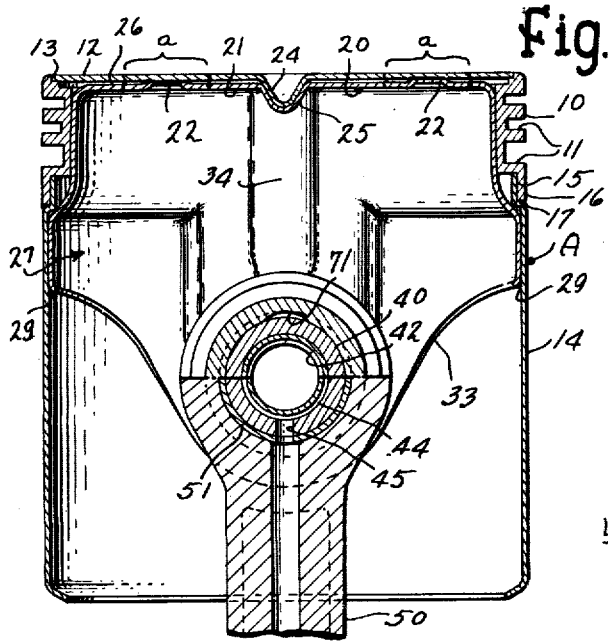
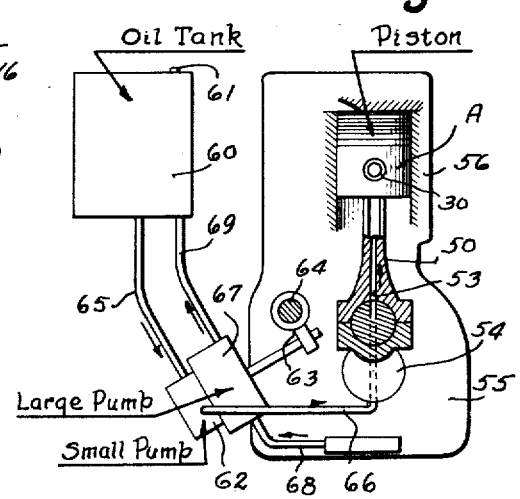
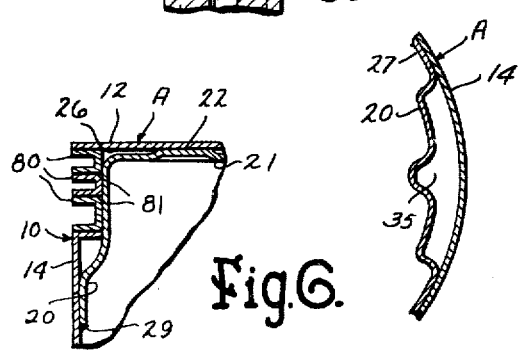
INVENTOR.
Clyde R. Paton
BY Tibbetts & Hart
Attorneys Patented Oct. 23, 1945

2,387,344

UNITED STATES PATENT OFFICE 2,387,344

INTERNAL-COMBUSTION ENGINE

Clyde R. Paton, Birmingham, Mich., assignor to Packard Motor Car Company, Detroit, Mich., a corporation of Michigan Substituted for abandoned application Serial No. 410,722, September 13, 1941. This application November 23, 1944, Serial No. 564,806

8 Claims. (Cl. 123—176)

This invention relates to internal combustion engines and particularly to the pistons thereof. The present application is a substitute for abandoned application 410,722, filed September 13, 1941.

Two most desirable qualities in a piston for an internal combustion engine, such as is used in motor vehicles and aircraft, are first, that it should be of light weight, and second, that it should have facilities for cooling.

The present invention contemplates a piston built up mostly of steel stampings, thus assuring light weight, and it also contemplates a cooling system in which oil or other coolant is fed to the piston head at one side thereof and carried off at the other side.

One of the objects of the invention, therefore, is the production of a light weight piston of considerable strength.

Another object of the invention is to provide a piston of novel construction in which the head is liquid cooled.

Other objects of the invention will appear from the following description taken in connection with the drawing which forms a part of this specification, and in which:

Fig. 1 is a sectional view substantially on the line 1—1 of Fig. 2, showing a piston made in accordance with this invention;

Fig. 2 is a top view of the piston shown in Fig. 1 with a portion broken away and shown in section substantially on the line 2—2 of Fig. 1;

Fig. 3 is a sectional view of the piston of Fig. 1 taken substantially on the line 3—3 of Fig. 2, except that the sections indicated at *a* are on the lines 3a—3a of Fig. 2;

Fig. 4 is a small diagrammatic view of an engine and oil circulation means showing the piston cooling system;

Fig. 5 is a section substantially on the line 5—5 of Fig. 1; and

Fig. 6 is a fragmentary sectional view of a piston showing a modification of the ring groove portion of the piston of Fig. 1.

Referring to the drawing, the piston as a whole is referred to at A, and in the form shown in Fig. 1 it comprises several parts welded together. The ring groove part 10 is shown as a forging formed with piston ring grooves 11. The upper end of this ring portion 10 is closed by a head plate 12 which is welded to the ring portion as at 13. There is also a skirt or wall portion 14, the upper end of which is contracted slightly as at 15 to fit within a flange 16 on the ring portion. These parts are welded together as shown at 17.

The skirt 14 is formed with inwardly extending boss receiving portions 18 and the lower edge of the skirt is turned inwardly as at 19 after the liner, hereinafter referred to, has been inserted.

Internally the piston is provided with a liner 20 which has a head portion 21 formed with several upwardly extending bosses 22 and 23. These are spaced around the head at convenient points to support the head plate 12 and to form deflectors for spreading the coolant so that the latter reaches all parts of the space. Some of these bosses are welded to the head plate 12 and as shown it is the bosses 22 that are so welded. There may be more or less of these bosses and more or less of them may be welded to the head plate.

The head plate 12 and the head 21 of the liner 20 are each shown as formed with a central downwardly extending projection for centering the two parts and for forming additional support for the head plate. These nested projections are indicated at 24 and 25 respectively.

By this arrangement of the head plate and the liner the head of the piston is formed with separated walls having a space 26 between them, which space is adapted to receive a cooling liquid.

The liner 20 has a cylindrical side wall 27, the upper portion of which fits within the ring portion 10 of the piston and the lower portion of which fits within the skirt and is formed with boss receiving portions 28 similar to and in line with the boss receiving portions 18 of the skirt. The entire lower edge of the liner 20 is preferably welded or otherwise secured to the adjacent skirt as shown at 29 in Figs. 1 and 3.

The piston bosses are formed by two boss members 30 contained within the boss receiving parts 18 and 28. These boss members may be pressed in place from the inside towards the outside and have their outer ends spun outwardly as shown at 31, and welded to the piston skirt as shown at 32, thus securing the bosses to both the piston skirt and the liner.

The liner 20 is cut away on both sides as at 33 and the portion of it above this cut away portion and below the ring portion of the piston, and the portion extending below the bosses 28, are expanded so that these portions contact the inner wall of the piston skirt, thus permitting the welding of the entire lower edge of the liner to the piston skirt, as at 29 referred to above.

The liner 20 at opposite points in its circumference and preferably directly above the piston bosses is pressed inwardly to form ducts 34 and 35 extending from the bosses to the head. The duct 34 may be called the inlet duct or passage and duct 35 the outlet duct or passage, as will be more particularly described hereinafter. Thus, oil entering the space 26 from the duct 34 will spread out over the head of the liner and completely fill the thin space 26 and pass out of the space into the duct 35 and downwardly to the boss 30 at the opposite side of the piston. The bosses 22 and 23 tend to deflect or spread the oil out as it enters the space and the space 26 is so constructed relative to the capacity of the duct 34 that the oil must spread out over the head in passing from one side of the piston to the other.

The boss members 30 form bearings for the floating piston pin 40 which is held within the bosses by the usual split expanding rings 41 at each end of the pin 40.

The piston pin 40 is hollow and within it is a tube 42 having its ends spun out as at 43 to retain it within the pin. The tube 42 is contracted somewhat between its middle portion and the left end, as shown in Fig. 1, thus forming a space 44 extending from an opening 45 in the pin 40 to an outlet opening 46 near the left hand end of the pin. Since the pin 40 floats in the piston bosses an annular groove 47 is provided so that the opening or port 46 may always connect with a port 48 formed in the left hand boss 30 and with the duct 34 of the piston. Thus oil fed to the port 45 will travel through the space 44 in the pin 40 and out of the pin through the port 46 and through the port 48 into the duct 34 and thence upwardly to the space in the piston head.

Surrounding the middle portion of piston pin 40 is the engine connecting rod 50 which has bearing sleeves 51 with an annular groove 52 surrounding the pin 40 in the zone of the port 45. The connecting rod 50 is drilled throughout its length forming a passage 53 connected with the groove 52. At its lower end the connecting rod 50 is mounted on a crank of the engine crankshaft 54 which in turn is mounted in the crankcase 55 of the engine. These latter parts are shown in Fig. 4 as is also the engine cylinder 56 in which the piston A is mounted.

Means for feeding oil or other coolant to the piston head space comprises the parts hereinbefore described, together with the other elements shown in Fig. 4. Thus there is a reservoir 60 for oil, this reservoir having an air vent 61, and there is a pump 62 driven by the engine as shown by the gearing 63 operated by the engine cam shaft 64, a pipe 65 leading from the reservoir 60 to the pump 62 and a pipe 66 leading from the pump 62 to the bearings of the crankshaft 54 and to the interior of the crankshaft itself. From the crankshaft the oil under pressure from the pump 62 is led to the passage 53 in the connecting rod 50 and thence into the space 44 of the piston pin 40, then into the duct 34 of the piston and into and across the piston head through the space 26. The oil then passes outwardly through the duct 35 and back into the crankcase 55. A second pump 67, preferably larger than the pump 62, withdraws oil from the crankcase 55 through the pipe 68 and delivers it through a pipe 69 into the reservoir 60, thus providing what is known as a "dry sump" and permitting any air that may be in the system to escape through the vent 61 of the reservoir 60.

The oil or other cooling liquid which passes downwardly through the duct 35 reaches the interior of the piston by a port 70 in the righthand boss 30 of Fig. 1 and thence through a metered passage 71 between that boss and the portion of the piston pin which it surrounds. As shown, this passage 71 is in the form of a longitudinal groove in the boss 30 and it extends from the port 70 to the inner end of the boss so that the oil may be delivered to the interior of the piston and thence to the crankcase at that point. It is called a metering passage because it determines the amount of oil that may pass at this point and its capacity is less than the capacity of the duct 34 and the ports and passages which lead to that duct. The purpose of this is to make sure that the cooling spaces and passages in the piston shall always be filled with oil while the engine is running because if it is not there is danger of some of the oil coking in the passages and this would tend to block them. But by keeping the space 26 constantly filled with circulating oil the cooling effect will be attained without heating the oil to the point of coking.

The metering groove is in fact very small in cross section and is shown as large as it is for clarity only. It is assured of being kept clear of obstructions by reason of the fact that the piston pin 40 floats in the bearing 30 and this constant movement tends to dislodge any particles that may enter the passage.

In Fig. 6 the ring groove portion 10 of the piston is formed of 3 annular rings 80 of channel cross section, which rings are either welded or copper brazed together as shown at 81 to form substantially the same ring portion as that shown in Fig. 1. The same head plate 12 is welded or otherwise secured to the upper of these rings, and the same skirt 14 is secured to the lower ring. The same liner 20 is secured inside the piston welded as at 22 and 29. The cooling space 26 is also shown.

It will be understood that various forms of the invention other than those described above may be used without departing from the spirit or scope of the invention.

What is claimed is:

1. A piston and piston pin construction comprising a piston having a double walled head forming a cooling space, having pin bosses and having inlet and outlet ducts extending between the respective pin bosses and head space, a piston pin mounted in said bosses and provided with means forming a passage for oil from the interior of the pin to one of said bosses, and means between the other of said bosses and said pin providing a metering outlet from the adjacent duct to the interior of the piston.

2. A piston comprising a ring groove portion made up of a plurality of rings of channel cross section welded together, a head plate secured to the upper of said rings, a piston skirt secured to the lower of said rings and a liner within the piston secured to the head plate and to the skirt and forming a cooling space in the piston head.

3. A piston having a head, side wall, and pin bosses in the side wall, the head of the piston having double walls forming a cooling space with spaced supporting bosses between said walls, and the side wall being formed at opposite sides of the piston with inlet and outlet ducts between the respective pin bosses and the head space.

4. A piston having a head formed with double walls spaced to provide a thin cooling space and with a plurality of spaced supporting bosses to deflect coolant passing from one side of the piston to the other.

5. A piston and piston pin construction comprising a piston having a double walled head forming a cooling space and having pin bosses, a piston pin floatingly mounted in said bosses, said bosses and pin providing means forming a metering passage, and means in the piston providing a communication between said space and said metering passage.

6. The combination with a piston and connecting rod, said piston having a boss formed with a metering groove therein, of a piston pin floatingly mounted in both the piston and connecting rod whereby the metering groove is kept clear of obstructions, and means retaining the piston pin against undue endwise movement.

7. The combination with a piston having a double walled head forming a space between said walls, of means for feeding coolant to one side of said space, means for spreading the coolant as it passes across the piston to the other side of said space, and means providing a metering outlet from said space opposite the feeding means and of less capacity than the feeding means.

8. A piston comprising a head, and a separately formed inner liner member having a head portion separated from the piston head to form a thin cooling space, and said liner member and skirt formed with inlet and outlet ducts between their walls at opposite sides of the piston, said ducts connected to said cooling space.

CLYDE R. PATON.

CERTIFICATE OF CORRECTION.

Patent No. 2,387,344. October 23, 1945.

CLYDE R. PATON.

It is hereby certified that error appears in the printed specification of the above numbered patent requiring correction as follows: Page 3, second column, line 8, claim 8, before "and" insert the words and comma "a skirt,"; and that the said Letters Patent should be read with this correction therein that the same may conform to the record of the case in the Patent Office.

Signed and sealed this 19th day of March, A. D. 1946.

Leslie Frazer (Seal)　　　　　　　　　　First Assistant Commissioner of Patents.

prising a piston having a double walled head forming a cooling space and having pin bosses, a piston pin floatingly mounted in said bosses, said bosses and pin providing means forming a metering passage, and means in the piston providing a communication between said space and said metering passage.

6. The combination with a piston and connecting rod, said piston having a boss formed with a metering groove therein, of a piston pin floatingly mounted in both the piston and connecting rod whereby the metering groove is kept clear of obstructions, and means retaining the piston pin against undue endwise movement.

7. The combination with a piston having a double walled head forming a space between said walls, of means for feeding coolant to one side of said space, means for spreading the coolant as it passes across the piston to the other side of said space, and means providing a metering outlet from said space opposite the feeding means and of less capacity than the feeding means.

8. A piston comprising a head, and a separately formed inner liner member having a head portion separated from the piston head to form a thin cooling space, and said liner member and skirt formed with inlet and outlet ducts between their walls at opposite sides of the piston, said ducts connected to said cooling space.

CLYDE R. PATON.

CERTIFICATE OF CORRECTION.

Patent No. 2,387,344.  October 23, 1945.

CLYDE R. PATON.

It is hereby certified that error appears in the printed specification of the above numbered patent requiring correction as follows: Page 3, second column, line 8, claim 8, before "and" insert the words and comma "a skirt,"; and that the said Letters Patent should be read with this correction therein that the same may conform to the record of the case in the Patent Office.

Signed and sealed this 19th day of March, A. D. 1946.

Leslie Frazer (Seal)  First Assistant Commissioner of Patents.